E. B. BROWN.
VEHICLE WHEEL TIRE.
APPLICATION FILED SEPT. 14, 1912. RENEWED DEC. 31, 1913.
1,105,958.
Patented Aug. 4, 1914.
2 SHEETS—SHEET 1.
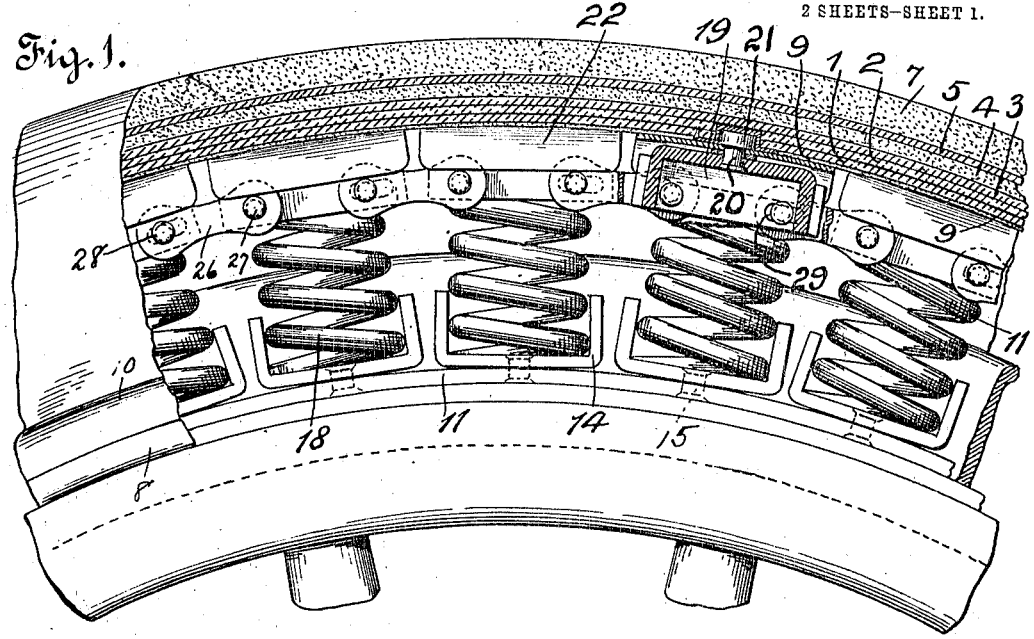
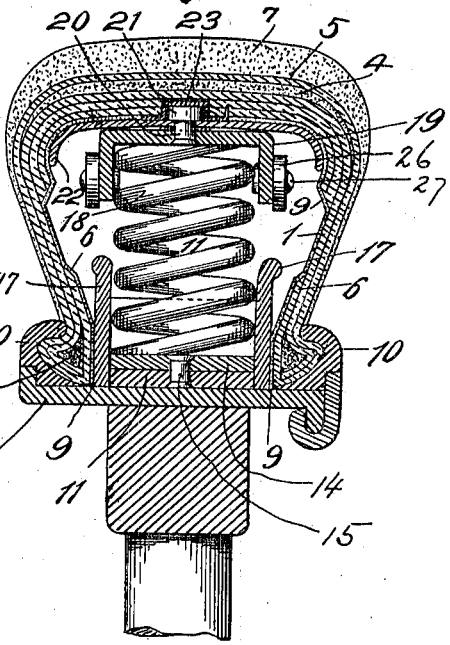
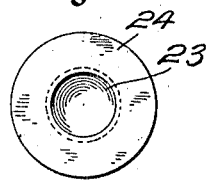
Witnesses,
Inventor,

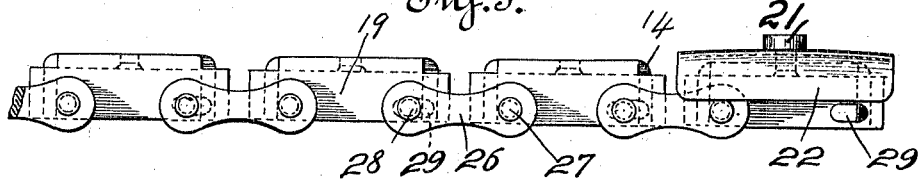
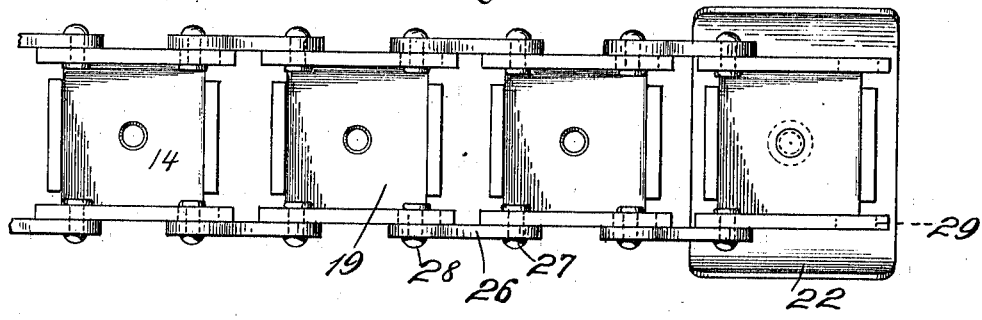
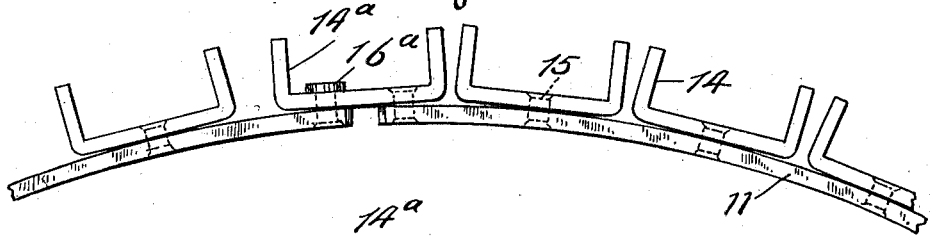
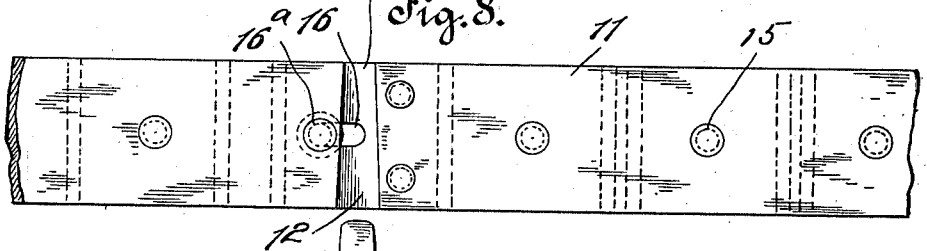
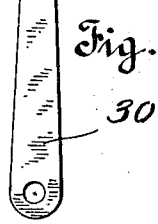

UNITED STATES PATENT OFFICE.

EGBERT B. BROWN, OF LOS ANGELES, CALIFORNIA.

VEHICLE WHEEL-TIRE 1,105,958.     Specification of Letters Patent.     Patented Aug. 4, 1914.

Continuation of application Serial No. 671,308, filed January 15, 1912. This application filed September 14, 1912, Serial No. 720,413. Renewed December 31, 1913. Serial No. 809,723.

*To all whom it may concern:*

Be it known that I, EGBERT B. BROWN, a citizen of the United States, residing in the city of Los Angeles, county of Los Angeles, and State of California, have invented certain new and useful Improvements in Vehicle Wheel-Tires, of which the following is a specification.

One of the main objects of this invention is to provide a yieldable resilient tire which will have all the characteristics of the ordinary pneumatic tire but which will be more durable than a pneumatic tire and which will not depend upon an air cushion for its resiliency.

Another object of the invention is to provide an improved tire casing which will be more durable than the tire casing of the ordinary construction and in which a tread portion of rubber or similar plastic material will be firmly interlocked and secured to a fibrous fabric portion so that said tread portion cannot separate from the fabric portion of the casing.

Another object of the invention is to provide coil springs within the casing to expand it and to give it its resiliency; and further to provide means whereby the outward strain of said springs will be distributed throughout the tread portion of the tire casing, thereby preventing all distortion of the tread of the casing.

There are other objects and advantages of the invention which will appear hereinafter.

In the drawings, Figure 1 is a side elevation of a portion of a wheel constructed in accordance with my invention, the tire casing and one of the spring holding devices being shown in the sectional view; Fig. 2 a transverse sectional view of the tire; Fig. 3 a perspective view of one of the thrust receiving sockets; Fig. 4 a plan view thereof; Fig. 5 a detail side elevation of a portion of the chain carrying the spring retaining caps; Fig. 6 a bottom view of the chain and caps shown in Fig. 5; Fig. 7 a side elevation of a portion of the spring retainer band and the spring-receiving caps attached thereto; Fig. 8 a view of the inner side of the band shown in Fig. 7; and Fig. 9 a detail view of the wedge used for expanding the retainer band.

The tire casing is formed of two or more layers of a fibrous fabric laid over a suitable form, as shown at 1, 2 and 3 in Fig. 1, the clencher ribs 13 being formed along the marginal edges of the casing. Above these fibrous fabric portions 1—2—3 of the casing I place a layer 4 of rubber gum of the necessary thickness, this gum layer tapering toward its edges and being thickest across the outer face of the casing. Above this layer of gum I stretch another fibrous fabric member 5. This member is carried around the entire casing and around the clencher ribs, said layer terminating on the inner side of the fabric portion 1 of the tire, as shown clearly in Fig. 2, at a point 6 above the clencher ribs 13. Over this reinforcing or tread anchoring member 5 is laid a heavy layer of rubber gum 7 which forms the tread. This layer of gum is prolonged and carried around the sides of the casing in a thinner layer; and said thinner layer extends to the clencher ribs. The member or portion 5 of the casing becomes completely embedded in the rubber layers 4 and 7 extending across the tread of the tire casing and securely anchors the tread portion to the fabric portion. By carrying this anchoring member around the clencher ribs 13 it will be securely clamped and rigidly held within the clencher rings when the casing is in place on a wheel. The inner side of the tire casing is covered completely by a thin layer 9 of fibrous material coated on one side with rubber. The material I prefer to use is known as "bare back". It is closely cemented to the interior of the tire casing.

It is obvious from this use of the reinforcing and tread anchoring member 5 that the tread portion of the casing is greatly strengthened, and is locked to the fabric portion of the tire casing. It is also obvious that by carrying the anchoring member around the clencher ribs the tread is locked by the clencher rings, thereby making it practically impossible to tear the tread from the casing.

To expand the tire casing and render the same resilient I employ a series of radially arranged compression springs and provide means whereby they may be held in place within the tire casing by the ordinary clencher rings. The wheel rim 8 is secured to the outer surface of the ordinary tire felly in any suitable manner; and to this rim are secured the clencher rings 10. These clencher rings may be of any suitable form. On the outer face of the rim is arranged a spring retainer band 11. This retainer band is normally slightly smaller in diameter than the rim so that it must be expanded to place it in position on the rim. To facilitate the expansion of this band the ends thereof are inclined inwardly toward each other to form a wedge shape opening 12 between them, as clearly shown in Fig. 8. To expand the band a wedge 30 is provided, said wedge being adapted to be forced inwardly between the ends of the retainer band. By thus expanding the band it may be readily slipped over and removed from the wheel rim. It is manifest that when the band is in position on the wheel rim it will contract and tightly grip said rim as soon as the expanding wedge is removed. It is obvious that when it is desired to remove the band from the rim it is only necessary to again force the wedge in between the inclined ends of the band. Rigidly secured to the retainer band are a series of U-shape spring-receiving pockets 14. These pockets are spaced a suitable distance apart around the retainer band and the outwardly extending members thereof are arranged adjacent each other so that they lie between the springs carried by the pockets and prevent any movement of the springs toward each other. The distance between the outwardly extending members or walls of each pocket is equal to the diameter of the spring adapted to be contained within the pocket so that said spring can have little or no movement between said walls or members. These walls are only of sufficient length to extend outwardly beyond one or two coils of the spring. Each pocket is rigidly connected to the retainer band by means of a central securing means, such as a rivet 15; and said pockets are arranged so that their outwardly extending walls lie quite close together, only sufficient space being left between them to permit of the necessary movement or oscillation thereof without binding against adjacent pockets. The pocket 14ª which bridges the joint between the two ends of the retainer band is rigidly connected to one end of the band and slidably connected to the other end of the band by means of a slot 16 in the pocket and a rivet 16ª in the band, said rivet passing through said slot. This permits the two ends of the band to be moved toward and from each other, as hereinbefore described. It will, of course, be understood that the ends of the retainer band do not abut against each other when the band is contracted about the wheel rim, thereby permitting the band to clench firmly upon the surface of the rim and permitting the reintroduction of the expanding wedge when it is desired to detach the band from the rim. The number of spring pockets or holders used will, of course, depend upon the diameter of the wheel and the diameter of the springs used, but it will, of course, be understood that any suitable size springs may be employed to suit the wheel to the use for which it is designed.

On the wheel rim 8 and abutting against the edges of the retainer band 11 are a pair of ring plates 17, one plate being arranged against each edge of the retainer. These plates fit snugly against the rim 11 of the wheel and extend outwardly a considerable distance beyond the outer ends of the walls of the U-shaped pockets, shown clearly in Fig. 2 of the drawings. These plates prevent any material sidewise or lateral movement of the springs, the channel formed by said plates being sufficiently large, however, to permit of a slight lateral movement of the springs. The plates at their outer edges are rounded to form a slight bead or head flange. The object of this is to avoid any sharp edges or corners over which the coils of the springs might become engaged and against which they might bind when the wheel is in use.

In each of the U-shaped pockets is placed a coil compression spring 18, said springs being radially arranged around the tire. The outer ends of these springs are received within rectangular caps 19 which are secured to the tire casing. Each cap is provided with an outwardly projecting, centrally arranged stud 20, and is provided on its outer end with an enlarged circular head 21. On each stud between the head 21 and the cap 19 is arranged a transversely curved spring metal shaper plate 22 which bears against the inner side of the tire casing and holds it yieldingly in proper shape. In the tire casing are set, and permanently secured, circular metallic sockets 23 which are adapted to snugly receive the heads 21 of the studs 20. Each of these sockets is formed with a broad radial flange 24, said flanges carrying outwardly extending prongs 25 which are adapted to enter the fabric members of the tire casing. These sockets are placed around the inner side of the casing one socket being axially in line with each spring. In making up the tire casing the inner reinforcing fabric sections or layers are perforated to receive the sockets; said sockets are inserted therein and the sections are then stretched over the core upon which the tire casing is to be formed. These fabric members or sections are thoroughly saturated with rubber cement before they are applied to the former, and, therefore, after vulcanizing, the sockets are very strongly secured to the casing. The prongs 25 enter the fabric portion of the casing and secure the sockets against any tendency to revolve. The advantage of this manner of taking up the thrust of the springs and holding the caps 19 in place are obvious. By the use of the sockets the elongation and distortion of the casing or tread is prevented, said sockets or caps at all times evenly distributing the strain brought upon the tread of the casing.

The side walls of the caps 19 are connected together around the wheel by means of links 26, said links and the caps forming an endless chain around the wheel adjacent the inner surface of the casing. These links serve to hold the caps in position with respect to each other and serve to transmit any lateral strain brought on one cap and spring to the adjacent caps and springs. Each link is connected to one cap by a rivet 27, the other end of the link being secured to the adjacent cap by means of a rivet or pin 28 which engages within a slot 29 in the side wall of the caps so that each cap will have a limited movement independently of the adjacent connected caps.

The ring plates 17 assist in holding the clencher ribs in engagement with the clencher rings as they form a rigid inner wall against which the inner sides of the ribs rest so that said plates serve the double purpose of holding the springs and the clencher ribs in position.

This application is a continuation of my former application, Serial No. 671,308, filed January 15, 1912.

What I claim is:

1. A vehicle wheel tire comprising a retainer band normally fitting the wheel rim, a series of pockets connected to said band and having outwardly extending end walls only, a radially arranged spring in each pocket, a ring plate fitting against and closing each side of the pockets and forming an annular channel for the pockets and springs, means for flexibly connecting together the outer ends of the springs, a tire casing inclosing the springs and formed with clencher ribs on its marginal edges, clencher rib gripping means carried by the vehicle wheel rim, the ring plates serving as means for locking the clencher ribs in the clencher rib gripping means.

2. A vehicle wheel tire comprising a casing, a spring holding means adapted to extend around a wheel felly, radially arranged springs carried by said holding means, a cap for the outer end of each spring and formed with inwardly extending side walls, a pair of pivoted links connecting together the side walls of adjoining caps at each side thereof, said links being out of contact with the tire casing and forming with the connected caps an endless chain around the tire, and a transversely curved resilient shaper plate carried by each cap and adapted to bear against and conform to the interior of the tire casing.

In testimony whereof I hereunto affix my signature in the presence of two witnesses.

EGBERT B. BROWN.

Witnesses:
FRED A. YOUNG,
BONNER RICHARDSON.

Copies of this patent may be obtained for five cents each, by addressing the "Commissioner of Patents, Washington, D. C."